United States Patent [19]

Pak

[11] Patent Number: 4,879,125
[45] Date of Patent: * Nov. 7, 1989

[54] SANDWICH IN A LUNCH BOX

[76] Inventor: Tong S. Pak, Rte. 15, Box 115, Oak Grove Cir., Statesville, N.C. 28677

[ * ] Notice: The portion of the term of this patent subsequent to Aug. 23, 2005 has been disclaimed.

[21] Appl. No.: 232,851

[22] Filed: Aug. 16, 1988

Related U.S. Application Data

[63] Continuation-in-part of Ser. No. 924,261, Oct. 29, 1986, Pat. No. 4,765,998.

[51] Int. Cl.$^4$ .................. A21D 13/00; A23L 1/31; B65D 1/34; B65D 1/42
[52] U.S. Cl. .................. 426/120; 426/92; 426/138; 426/274
[58] Field of Search .................. 426/120, 119, 138, 92

[56] References Cited

U.S. PATENT DOCUMENTS

| | | | |
|---|---|---|---|
| 3,290,154 | 12/1966 | Turner | 426/139 |
| 4,205,091 | 5/1980 | Van Horne | 426/138 |
| 4,472,440 | 9/1984 | Bank | 426/138 |
| 4,653,685 | 3/1987 | Leary et al. | 426/115 |
| 4,765,998 | 8/1988 | Pak et al. | 426/92 |

Primary Examiner—Donald E. Czaja
Assistant Examiner—Mary S. Mims
Attorney, Agent, or Firm—Birch, Stewart, Kolasch & Birch

[57] ABSTRACT

A sandwich in a lunch box which includes an edible container in one part and two slices of bread with a meat product in the other part of the lunch box. When a consumer wants to eat, the edible container is combined with the bread, the container housing a salad therein and having a concave configuration disposed at the bottom surface having a circular edge portion, whereby the edible container tightly adheres to the meat product and prevents the salad from falling from the sandwich.

7 Claims, 1 Drawing Sheet

U.S. Patent  Nov. 7, 1989  4,879,125
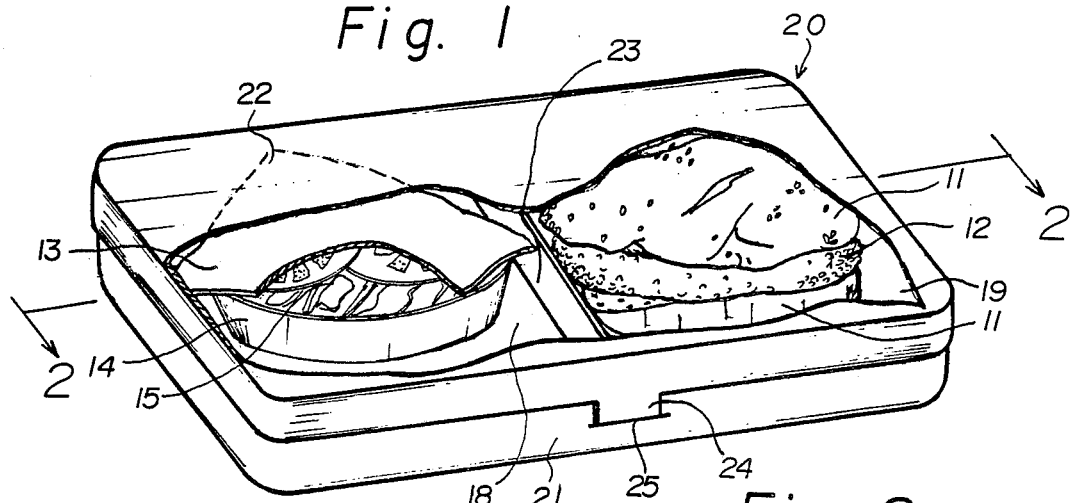
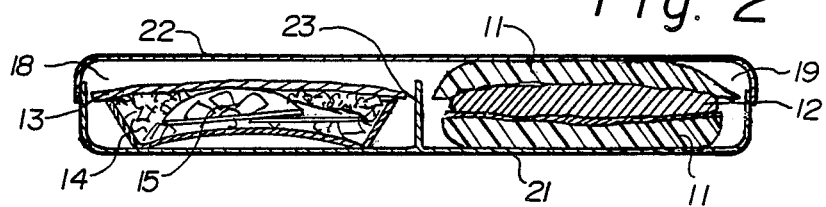
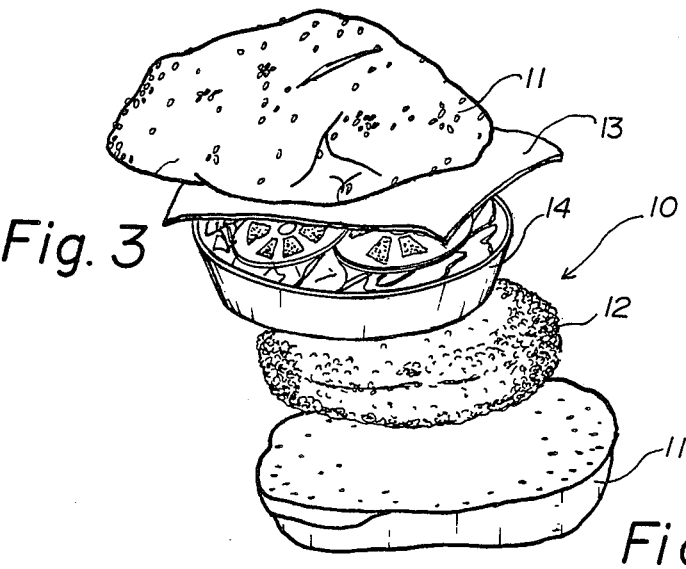
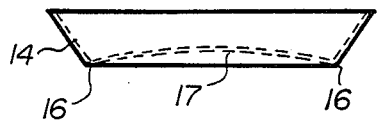
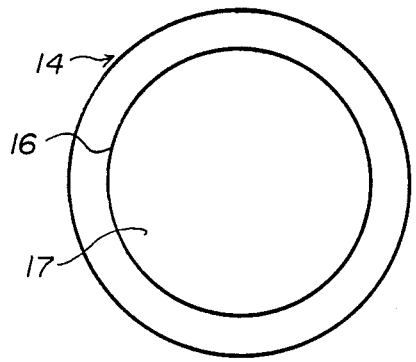

SANDWICH IN A LUNCH BOX

CROSS-REFERENCE TO RELATED APPLICATION

This is a continuation-in-part application of U.S. patent application, Ser. No. 924,261, filed on Oct. 29, 1986, which is now allowed.

BACKGROUND OF THE INVENTION

1. Field of the Invention

The present invention relates to an edible food product in a lunch box. More particularly, the present invention relates to a lunch box including a food product such as hamburger sandwich or other equivalent product which contains an edible container for holding a large quantity of fresh salad and a piece of cheese covered by the edible container in one part and two slices of bread with a piece of hamburger meat in the other part of the lunch box.

2. Description of the Prior Art

Over the years, the american sandwich, such as for example the hamburger, has become a truly national food. In fact, the popularity of the hamburger today has accelerated such that it probably enjoys a popularity equal to or greater than that of all other sandwiches. In keeping with the ever increasing demand for sandwiches such as hamburgers, the food industry has converted what was traditionally a food requiring many hours in the making into a fast food product. Also, in the ever increasing demand for hamburgers and other sandwiches containing a large quantity of fresh salad such as slices of pickles, slices of tomatoes, slices of onions and a garnish such as lettuce, the industry has provided restaurants with salad bars for use in garnishing sandwiches such as hamburger. Also, in a lunch box, there is a salad part and two slices of bread and a piece of a meat product. However, in this matter, it is difficult to insert large quantities of garnish salad material into the hamburgers since the materials tend to fall from the hamburger. Furthermore, the garnish salad material cannot be sanitarily inserted into the bread at one time.

Because of the desire to provide salad type garnish for sandwiches which can be readily incorporated into the sandwich and easily eaten while avoiding undue mess, many attempts have been made to facilitate the manner in which salad is added to a sandwich. None of these attempts can actually claim to have succeeded in this regard. Consider, for example, U.S. Pat. No. 1,807,189 to Bemis which discloses a food product such as a sandwich wherein a bun is split at its sides and bottom end to form a pocket and a garnished filler made of solid edibles, is inserted into the pocket. These fillers often consist of a garnish in the form of lettuce, a meat product or hot-dog, and a further garnish or appetizer in the form of pickle slices. However, since the garnish is assembled together with the hot meat product recently cooked, the fresh lettuce and cold pickle in the pocket of the Bemis patent is converted to a warm salad. Furthermore, it is difficult to insert fillers in all quantities into the pocket of the Bemis patent.

OBJECTS AND SUMMARY OF THE INVENTION

Accordingly, it is an object of the present invention to provide an improved food product in a lunch box which contains an edible container for holding a large quantity of fresh salad and a process of making the same.

Another object of the present invention is to provide a sandwich in a lunch box which is provided with an edible dish and two slices of bread. When the edible dish is inserted between two slices of bread, the edible dish adapted to contain a large quantity of salad such as lettuce, tomatoes, onions and/or pickles, and the like for eating with the meat, providing sufficient and fresh salad for good health, and preventing the salad from scattering from the sandwich.

A further object of the present invention is to provide a sandwich, such as a hamburger which contains an edible dish disposed therein which is structured with a concave configuration disposed at the bottom surface thereof and a circular convex portion disposed along the edge thereof whereby the edible dish is adapted to be added to the meat sandwich.

Still another object of the present invention is to provide a hamburger which contains a edible dish disposed therein which is structured with a V-shaped configuration to allow for convenient stacking during storage.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention relates to a food product in a lunch box including an edible container for housing a cold, fresh salad in one part and slices of bread with a meat in the other part of the lunch box. The edible container includes a concave configuration disposed at the surface of the bottom thereof and a circular convex portion disposed along the edge thereof for causing the edible container to tightly adhere to the meat disposed in the sandwich product when the edible container having fresh salad is inserted between the slices of bread.

BRIEF DESCRIPTION OF THE DRAWING

The present invention will become more fully understood from the detailed description given hereinbelow and the accompanying drawings which are given by way of illustration only, and thus are not limitative of the present invention, and wherein:

FIG. 1 is a perspective view of a hamburger in a lunch box showing in cut away portions thereof the edible dish in one part and two slices of bread and a piece of meat and cheese in the other part of the lunch box of the present invention;

FIG. 2 is a sectional view of FIG. 1, taken along line 2—2;

FIG. 3 is an exploded, perspective view of a hamburger containing the edible dish of the present invention when the edible dish is inserted into two slices of bread;

FIG. 4 is a front elevational view of the edible dish of the present invention; and FIG. 5 is a bottom plan view of the edible dish of the present invention.

DESCRIPTION OF THE PREFERRED EMBODIMENTS

The present invention is unique in that it is distinguishable from a hamburger which is made-to-order, even though it appears similar to such a hamburger. The reason for this is probably due most significantly to the fact that the edible container disposed in open part of a lunch box contains a large quantity of salad therein and also to the fact that the specially configurated container tightly adheres to the meat in the hamburger disposed in the other part of a lunch box. Advantageously the separate fresh and cold salad although disposed next to the hot cooked meat, when the edible container is combined with the hamburger, remains fresh and secured within the edible container and thus does not scatter from the sandwich so that the consumer can eat a lot of fresh salad with the meat e.g. hamburger for good health.

Referring now in detail to the drawing of the purpose of illustrating the present invention, the food product, for example the hamburger 10 in a lunch box 20 as shown in FIGS. 1, 2, and 3, includes the lunch box 20, an edible container 14 for housing a salad 15 such as slices of tomatoes, onions pickles, lettuce, cabbages and/or the like and a piece of cheese 13 covering the edible container 14 in a container part 8 of the lunch box 20. And the food product 10 in the lunch box 20 further includes two slices of bread 11 and a piece of meat, e.g hamburger 12 recently cooked, in a bread part 19 of the lunch box 20.

The hamburger 10 is divided into two parts and stored in the two parts 18 and 19 of the lunch box 20. The lunch box 20 is partitioned with a partition 23 for placing the edible container containing the salad 15 and the piece of cheese 13 in the container part 18 and the two slices of bread 11, with the piece of meat 12 in a bread part 19 thereof so that the cold and fresh salad 15 cannot be disposed next to the hot meat hamburger and the warm bread.

The lunch box 20 is composed of a cover 20 and a base container 21. The cover 22 is provided with a raised portion 24 for locking a hole 25 disposed in the base container 21.

Also, the dish 14 can be formed into a V-shaped configuration to allow for convenient sticking during storage (FIG. 4).

Usually, the meat e.g., hamburger 12 is cooked immediately before the hamburger 10 is sold or eaten. Therefore, the hot meat e.g., hamburger 12 can cook the fresh and cold salad 15. However, according to the present invention, the use of the edible container 14 which houses the fresh and cold salad 15 therein prevents the salad 15 from being cooked and at the same time prevents the salad 15 from falling from the sandwich. The edible container such as dish 14 is made of edible materials such as potato, wheat flour, and/or rice and cooked in a conventional manner. The dish 14 of the present invention is conventionally reconstituted such as by broiling, frying in an oil and/or baking.

When the dish 14 is made mainly of potato, for example in an amount of 80% by weight, then fried in oil and inserted in the slices of bread and the meat according to the present invention, the conventional hamburger is improved with a french fried potato chip filler.

In use, the edible container such as the dish 14 described above is filled with salad 15 such as slices of tomatoes, onions, lettuces, cabbages and/or pickles. The edible container 14 containing a large quantity of fresh, cold salad and the piece of cheese 13 is placed in the container part 18 of the lunch box 20. Also, the bread part 19 of the lunch box 20 contains two slices of bread 11 having a piece of meat e.g., hamburger 12 within slices of bread 11. When the consumer wants to eat the hamburger food product 10, after one slice of bread 11 is moved from the meat hamburger 12, the dish 14 containing the salad 15 covered by the piece of cheese 13 in the container part 18 of the lunch box 20 is then placed next to the top surface of the hot cooked meat e.g., hamburger 12 which is placed on the other slice of the bread 11 in the bread part 19 of the lunch box 20. Thereafter, the separated one slice of bread 11 is returned to the top of the edible dish 14 containing the salad 15 (FIG. 3). Since the dish 14 may be made mainly of potato, additional fried potato chips are unnecessary. In order to mass-produce, many dishes 14 containing the salad 15 therein are pre-prepared and placed in the container part 18 of the lunch box 20. And the slices of bread 11 with the meat 12 are immediately prepared for combining the pre-prepared salad container 14.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A sandwich in a lunch box which comprises:
   a lunch box having first and second parts partitioned in said lunch box,
   two slices of bread disposed in said first part, said two slices of bread having inserted therebetween a meat product, and
   an edible container disposed in said second part, said edible container housing a salad therein and having a concave configuration disposed at the bottom surface with a circular edge portion for causing the edible container to tightly adhere to the meat product when the edible container is inserted into said slices of bread, whereby the salad is separated from the meat product to maintain its fresh condition while at the same time prevented from falling from the sandwich.

2. The sandwich of claim 1, wherein the edible container is provided with a piece of cheese disposed over the salad therein.

3. The sandwich of claim 1 wherein the edible container is dish shaped.

4. The sandwich of claim 3 wherein the dish has a V-shaped configuration to allow for convenient stacking during storage.

5. The sandwich of claim 1 wherein the edible container is made of a material selected from the group consisting of potato, wheat, rice and a mixture thereof.

6. The sandwich of claim 3 wherein the edible container is made of potato.

7. The sandwich of claim 1 wherein the lunch box has an engagement member for locking said lunch box.

* * * * *